United States Patent
Ramprashad et al.

(10) Patent No.: US 10,313,808 B1
(45) Date of Patent: Jun. 4, 2019

(54) METHOD AND APPARATUS TO SENSE THE ENVIRONMENT USING COUPLED MICROPHONES AND LOUDSPEAKERS AND NOMINAL PLAYBACK

(71) Applicant: Apple Inc., Cupertino, CA (US)

(72) Inventors: Sean A. Ramprashad, Los Altos, CA (US); Adam E. Kriegel, Mountain View, CA (US); Sylvain J. Choisel, San Francisco, CA (US); Afrooz Family, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/455,760

(22) Filed: Mar. 10, 2017

Related U.S. Application Data (63) Continuation of application No. 14/920,611, filed on Oct. 22, 2015, now abandoned.

(51) Int. Cl.
*H04R 27/00* (2006.01)
*H04R 29/00* (2006.01)
*H04R 3/00* (2006.01)

(52) U.S. Cl.
CPC .......... *H04R 27/00* (2013.01); *H04R 29/007* (2013.01); *H04R 3/005* (2013.01); *H04R 2227/007* (2013.01); *H04R 2430/21* (2013.01)

(58) Field of Classification Search
CPC .. H04R 3/12; H04R 29/001; H04R 2205/021; H04R 25/453; H04R 3/02; H04R 27/00; H04R 2227/007; H04R 2420/07; H04R 25/407; H04R 3/005; H04R 5/033; H04R 5/04; H04S 2400/11; H04S 7/301; H04S 1/005; H04S 2420/01; H04S 7/305; H04S 7/307

See application file for complete search history.

(56) References Cited

U.S. PATENT DOCUMENTS

| | | | |
|---|---|---|---|
| 7,599,252 B2 | 10/2009 | Showen et al. | |
| 7,769,183 B2 | 8/2010 | Bharitkar et al. | |
| 8,009,516 B2 | 8/2011 | Crowell | |
| 9,097,795 B2* | 8/2015 | Ojala | G01S 15/003 |
| 2005/0037786 A1* | 2/2005 | Edge | H04W 56/002 455/502 |

(Continued)

*Primary Examiner* — Regina N Holder
(74) *Attorney, Agent, or Firm* — Womble Bond Dickinson (US) LLP (57) ABSTRACT

An electronic device having a device housing includes a loudspeaker and several microphones within the device housing. A control circuit is electrically coupled to the loudspeaker and microphones. The loudspeaker produces speech and/or music. The control circuit determines a statistical measure for a first data set representing individual impulse responses from the plurality of microphones and compares that to a predetermined statistical measure for a second data set representing individual object-free impulse responses from the plurality of microphones to determine if an object is near the device. The statistical measure may be variance and may be computed in the time domain. Variance may be calculated using differences between the individual impulse responses and a mean impulse response that is a linear combination of the impulse responses for the plurality of microphones. The control circuit may include echo cancellers to mitigate common signals and/or other acoustic sources.

25 Claims, 2 Drawing Sheets

(56) References Cited

U.S. PATENT DOCUMENTS

| | | | |
|---|---|---|---|
| 2008/0168839 A1* | 7/2008 | Katsuyama | G01S 7/52036 73/602 |
| 2011/0015924 A1 | 1/2011 | Hacihabiboglu et al. | |
| 2012/0063605 A1* | 3/2012 | Tawada | G01H 7/00 381/56 |
| 2014/0274212 A1* | 9/2014 | Zurek | H04M 1/6041 455/563 |

* cited by examiner

METHOD AND APPARATUS TO SENSE THE ENVIRONMENT USING COUPLED MICROPHONES AND LOUDSPEAKERS AND NOMINAL PLAYBACK

FIELD

This invention relates generally to presence and location sensing using acoustic waves, more particularly to sensing by analyzing the impulse responses of the system through which the acoustic waves pass.

BACKGROUND

It may be useful to sense the presence of objects around a device that produces sounds and includes microphones, such as a portable computer or cellular telephone. The sensing may be based on the estimation of acoustic paths between the microphones and loudspeakers on a device, such paths being influenced by objects around the device. At a highest-level the approach is similar to sonar, as done by animals such as bats and dolphins and machines such as submarines. However, the case of interest has some particular challenges.

One challenge is that the microphones and loudspeakers already have a non-trivial, even overwhelming, "self-coupling" independent of the environment and objects around the device. Furthermore, this self-coupling occurs at frequencies and times that overlap those of the "environmental-coupling" or "object-related-coupling".

Another challenge is to be able to do this sensing/detection by using regular signals, such as music and speech, and be able to sense/detect while other sounds in the environment, in particular ones similar to those played from the device but not originating from the loudspeakers, are present. Unlike sonar applications, no special signal-design is used. Sensing is done using signals like music and speech that are already being played out of the loudspeakers for purposes other than sensing objects, while also potentially in the presence of other similar signals not originating from the loudspeakers.

Microphones and loudspeakers may be located in the same device, and the distance of objects of interest may be similar to distances between the microphone-loudspeaker pairs. The device, such as a phone, may play speech and music on the loudspeakers. The device may be in the presence of speech and music that do not originate from the device. It may be desirable to perform environmental sensing anytime the device's loudspeakers are active, even when speech or music are currently originating from another source.

It would be desirable to detect objects in the presence of a concurrent time-frequency self-coupling that may be much larger than the environmental-coupling or object-related coupling components, as well as in the presence of other-source interference. In addition, it would be desirable to detect objects without the use of special signals by using nominal signals such as music and speech that are sent to the loudspeakers for purposes other than object sensing or detection.

SUMMARY

An electronic device having a device housing includes a loudspeaker and several microphones within the device housing. A control circuit is electrically coupled to the loudspeaker and microphones. The loudspeaker produces speech and/or music. The control circuit determines a statistical measure for a first data set representing individual impulse responses from the plurality of microphones and compares that to a predetermined statistical measure for a second data set representing individual object-free impulse responses from the plurality of microphones to determine if an object is near the device. The statistical measure may be variance and may be computed in the time domain. Variance may be calculated using differences between the individual impulse responses and a mean impulse response that is a linear combination of the impulse responses for the plurality of microphones. The control circuit may include echo cancellers to mitigate common signals and/or other acoustic sources. The device may include several loudspeakers and they may radiate more acoustic signal in one direction than another. Statistical characterizations of variances may depend on this radiation pattern.

Other features and advantages of the present invention will be apparent from the accompanying drawings and from the detailed description that follows below.

BRIEF DESCRIPTION OF THE DRAWINGS

In the following description, like drawing reference numerals are used for the like elements, even in different drawings. The matters defined in the description, such as detailed construction and elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Figure 1:
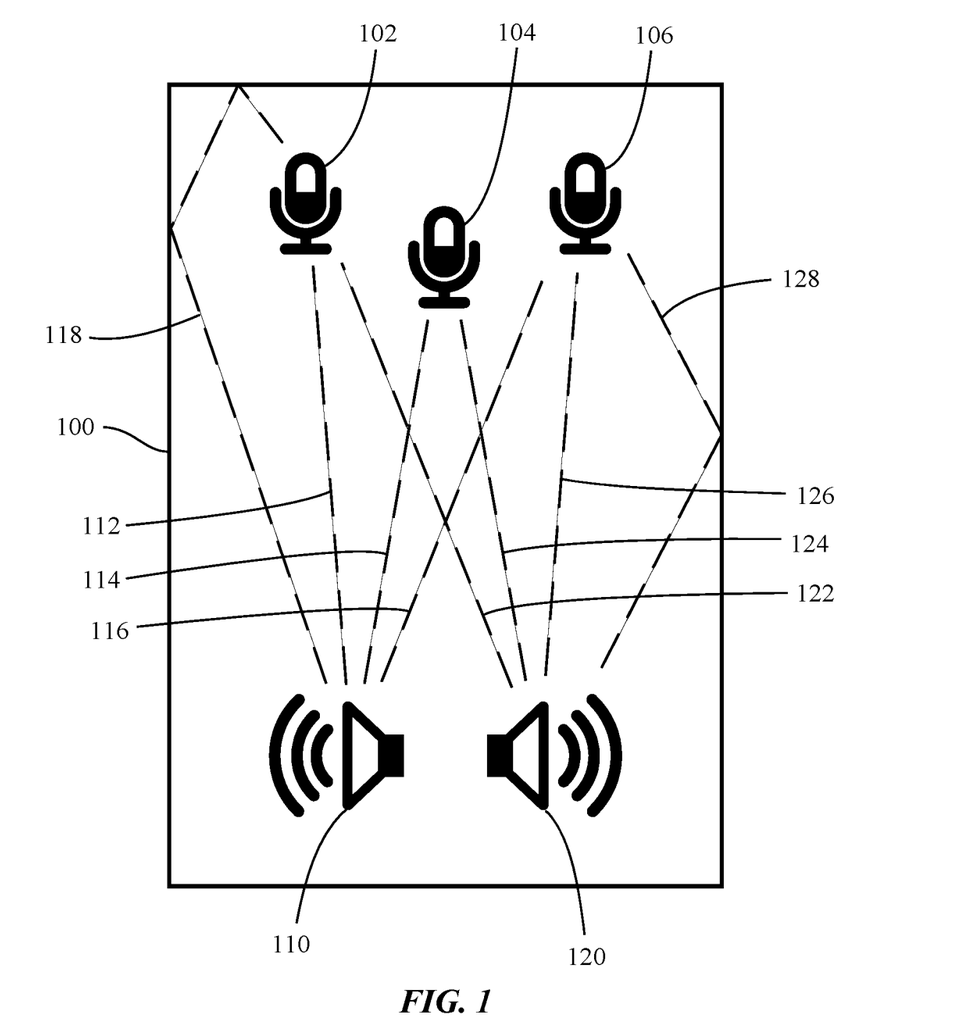
FIG. 1 is a block diagram of an electronic device that includes multiple microphones and one or more loudspeakers.

FIG. 1 is a block diagram of an electronic device 100 that includes multiple microphones 102, 104, 106 and one or more loudspeakers 110, 120. The multiple microphones 102, 104, 106 are used to detect and estimate various characteristics of objects, such as location, distance, acoustic reflection strength, acoustic reflection filtering, etc., in an environment around a device.

Sensing objects around the device 100 relies on the estimation of acoustic paths between the microphones and loudspeakers on a device, such paths being influenced by objects around the device. At a highest-level the approach is similar to sonar, as done by animals such as bats and dolphins and machines such as submarines. However, the case of interest has some particular challenges. One is that the microphones 102, 104, 106 and loudspeakers 110, 120 already have a non-trivial, even overwhelming, "self-coupling" independent of the environment and objects around the device. The self-coupling includes direct acoustic paths as suggested by the dashed lines 112, 114, 116, 122, 124, 126 between the loudspeakers 110, 120 and the microphones 102, 104, 106. The self-coupling also includes indirect acoustic paths as suggested by the dashed lines 118, 128 that reflect off of acoustically reflective surfaces of the device 100. Self-coupling may occur at frequencies and times that overlap those of the "environmental-coupling" or "object-related-coupling".

Another challenge is to be able to do this sensing/detection by using regular signals, such as music and speech, and be able to sense/detect while other sounds in the environment, similar to those on the loudspeakers but not originating from the loudspeakers, are present. Unlike sonar applications, no special signal-design is used. Sensing is done using signals like music and speech that are already being played out of the loudspeakers for purposes other than sensing objects.

This case of interest occurs when microphones and loudspeakers are located in the same device, and object distances are similar to inter loudspeaker-microphone distances. It also occurs with a device such as a phone where speech and music are often played on the loudspeakers, and where such a device operates in the presence of speech and music that do not originate from the device. We may want to be able to perform environmental sensing anytime the device's loudspeakers are active, even when speech or music are currently originating from another source.

Detection of objects thus happens in the presence of a concurrent time-frequency self-coupling that may be much larger than the environmental-coupling, as well as other-source interference. In addition, no special signal design is used, i.e., the system and method operates using nominal signals such as music and speech that are sent to the loudspeakers.

Figure 2:
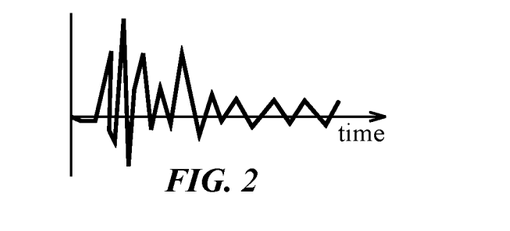
FIG. 2 is an exemplary IR based on the self-coupling of the loudspeakers to one of the microphones.

The acoustic path for a given microphone, with respect to the "common" signal on the loudspeaker or loudspeakers, can be characterized by an "impulse response" (IR). For the description to follow we term this a "mic-IR". This is essentially the time-domain (monophonic) signal response one would expect if the common signal was itself an impulse. FIG. 2 shows an exemplary IR based on the self-coupling of the loudspeakers 110, 120 to one of the microphones 102.

Figures 3, 4, 5:
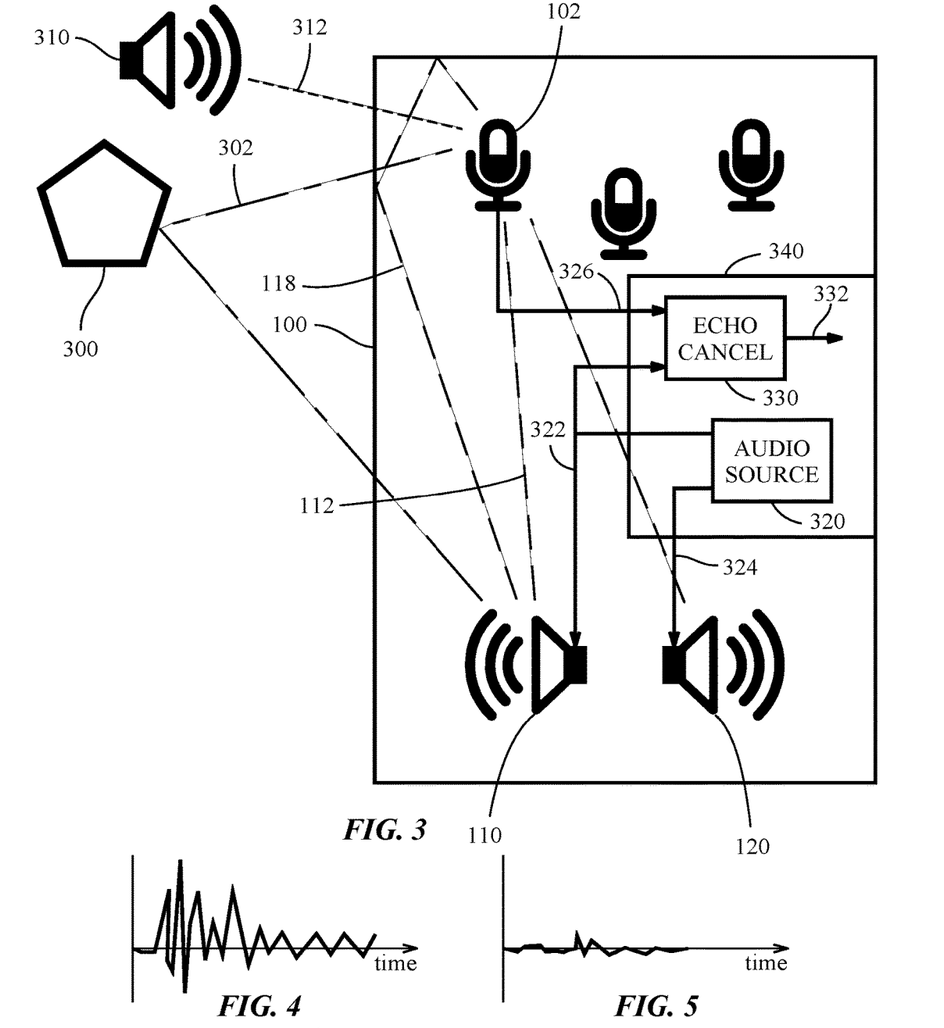
FIG. 3 is another block diagram of the device shown in FIG. 1 with an object close to the device.
FIG. 4 is an exemplary object-free IR.
FIG. 5 is an exemplary IR contribution of an object near the device.

FIG. 3 is another block diagram of the device 100 shown in FIG. 1 with an object 300 close to the device. Object detection/sensing begins with an initial setup and characterization(s) of the "object-free" behavior of the system. The device 100 includes a control circuit 340 with an audio source 320, such as an audio codec, that provides audio signals 322, 324 to each of the loudspeakers 110, 120. A common component "x(t)" of the signal(s) driving each of the loudspeakers is identified. For example, if the signal being played by the device is monophonic, then this monophonic signal is by definition common to all loudspeakers. The loudspeakers may have different EQs or filters applied to this common component before playback without affecting object detection/sensing. The use of calibrated mic EQs, which can compensate for both this effect as well as inherent differences in the coupling of different microphones, is described below.

For a given playback setup of the device 100, where playback settings include loudspeaker EQs (filters) applied to the individual loudspeaker 110, 120, the acoustic path between the common signal and each of the microphones is noted in one or more nominal object-free conditions. An object-free condition is one in which there are no objects, or significant objects around the device. The object-free condition may not be entirely free of objects. For example, the device could be on a table or placed on a surface. Objects may also be present but sufficiently out of range of the sensing distance of interest. For the purposes of this description "free" refers to being "free" of the types of objects other than those which are in the sensing range or which are essential/nominal.

There may be other acoustic sources 310 in the vicinity of the device 100. In order to determine a mic-IR in the presence of other acoustic sources 310 an echo-canceller 330 is used. The audio signal 322 that is sent a loudspeaker 110 and the signal from a microphone 102 are provided to the echo-canceller 330. The echo-canceller by nature is able to provide an echo-cancelled signal 332 that mitigates the effects of the common signal.

FIG. 3 shows the echo cancellation signal path for a single loudspeaker 110 and a single microphone 102. It will be appreciated that additional echo cancellation signal paths are provided for the other loudspeaker-microphone pairs in the device 100. The sum total of all paths to given mic is characterized by the mic-IR. An echo-canceller is able to estimate such IRs while appropriately handling other acoustic sources. The presence of such sources is a classic "double-talk" situation in echo cancellation terms. The echo-canceller appropriately mitigates the effect of such sources on the estimation using a variety of techniques.

A weighted/filtered mean-mic-IR is calculated for a collection of "mic-IRs" from multiple microphones. The mean-IR calculation is a linear combination of the mic-IRs. The design of the linear weights (more generally filters) is done so that there is a resulting small (even minimum) variance of individual mic-IRs with respect to this mean. The linear weights may be chosen and fixed based on the calculation of the predetermined object-free variance. In other embodiments, the linear weights may be chosen and fixed based on the device or the microphone geometry. In still other embodiments, the linear weights may be chosen based on the pre-processing of microphone data before the impulse response calculation. If the acoustic paths of each of the microphones in an object-free environment are very similar, as may be the case if the loudspeaker(s) are symmetrically placed with respect to the microphones, the "mean-path" may simply be the arithmetic mean of the mic-IRs. More generally, individual equalization filters may be applied to each mic-IR before averaging, where mean-IR is now defined as the mean of these EQ-ed mic-IRs. The EQs used, i.e., the mic-IR-EQs, are best designed (calibrated) using free-field measurements, preferably multiple such measurements.

Using one or more object-free measurements, and for a given playback setting of the loudspeaker, the variance of the individual (possibly EQ-ed) mic-IRs with respect to the mean-IR is characterized. This can be done in the design of the system before the customer uses it. It can be also learned by the system in known object-free situations when used by the customer. The "inter-IR" variance defines how much variation one expects between an individual mic-IR and the mean-IR when the device is in an object-free condition. The inter-IR variance can be calculated as a sample variance, as described below, where time-samples of IRs considered in the calculation are restricted to a time-domain region of interest. "IR-variance" is a mean-variance of all mics, i.e. the variance looking at samples across all mic-IRs together with respect to the common mean-IR. "Per-mic IR variance" is the variance looking at samples for a given mic-IR compared to the mean-IR.

The variances may be defined or characterized by one of more of the following techniques: a mean of the variance measures; a range of such variance measures; a probability distribution modeling of such variance measures. Probability-distribution modeling could itself be characterized by a mean and variance, e.g. using distributions such as Gaussian distributions, which can be specified by $1^{st}$ and $2^{nd}$ order statistics.

The time-domain region used in variance calculations is important. Among other considerations, the time-domain region used affects how accurately IRs can be estimated to a given length/interval of time and distance of interest of objects we want to detect. In general such characterization can happen for each of one or more sub-intervals, such intervals being subset of the full time-interval. Such sub-intervals can be overlapping in time.

After the initial setup and characterization(s) of the object-free behavior of the system, the system/device monitors mic-IRs, calculates mean-IRs, and creates samples of the inter-IR variance. This is done as the device plays nominal signals, such as speech and music, during nominal operation.

Mean-IRs and inter-IR variances are recalculated using new samples of IRs from each microphone. Such IRs can be estimated by echo-cancellers as described before. Mean-IRs and IR-variances can use a given sampling of mic-IRs collected over a particular duration in time. Different durations in time can then provide given different independent variance estimates. If needed, the IR-EQ designed beforehand for the free-field condition is used.

Figure 6:
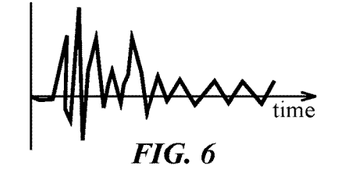
FIG. 6 is an exemplary IR that combines the object-free IR and the IR contribution of an object near the device.

When an object is placed near to the device the expectation is that the statistics of inter-IR variances changes from those characterized in the object-free case(s). With an object 300 near the device 100, acoustic paths 302 change. The IR will be a combination of the object-free IR, as suggested by FIG. 4, and the IR contribution of the object 300, as suggested by FIG. 5. The combined IR is suggested by FIG. 6. As suggested by FIGS. 4-6, the object-free IR that results from self-coupling may be a significantly stronger signal than the IR from the object so that the combined IR is only slightly changed from the object-free IR. The assumption behind seeing this change reflected in a change in inter-IR variance is that individual mic-IRs change with respect to one another in ways that are not like those seen in object-free scenarios. Thus the mean-IR calculation no longer necessarily produces a waveform as close to each of the individual IRs as would happen in an object-free condition.

Inter-IR variances then drive the detection of objects direction and distance. For example, when an object is present often this will be seen as a rise in the level of inter-IR variance. This can happen with respect to one or more time intervals, or over the total time interval of the complete IRs. The ratio of the instantaneous inter-IR variance to the mean object-free inter-IR variance is one statistic that measures such a change. Another statistic is the arithmetic difference between the measured inter-IR variance to the object-free inter-IR variance normalized by the standard deviation of the distribution of object-free inter-IR variances.

Under the assumption that the probability distribution of inter-IR variances in an object-free condition is Gaussian distributed, this normalized difference provides a log-likelihood measure (or percentile deviation) above or below the mean expected object-free level. Positive normalized differences above would indicate objects. It can also be seen by a localized rise in the inter-IR variance when the variance corresponds to a given sub-interval (or intervals) of the full time-interval.

Measured inter-IR variances, and associated statistics such as those mentioned above, can define either a detection flag or some confidence (e.g., likelihood or probability) that an object is near the device. This is done by statistical comparisons to the object-free characterization(s). Increased confidence in a decision can be achieved by making multiple measurements and considering a joint decision and or estimation over multiple measurements.

Object distance estimation can also be done using inter-IR variances restricted to various sub-intervals in time of the IR. For example, one can consider the inter-IR variance within a region of 2.0 to 2.5 milliseconds of the IRs. Many such, possibly overlapping, regional inter-IR variances may be noted. Noting the speed of sound, and making some geometrical assumptions about the shortest path possible between a loudspeaker and microphone, an estimate of distance to the object can be estimated using such sub-interval inter-IR variances. Such an estimate of distance relies on noting which region has the most inter-IR variance or most statistical deviation in variance from an object-free assumption.

Object direction estimation may also be performed. One method exploits multiple microphones to create multiple beams. IRs with respect to beams, i.e., "Beam-IRs", can also be determined either by beamforming mic-IRs, or beamforming microphones and estimating IRs on beamformed signals using an echo-canceller.

Analogous to the procedure using mic-IRs from microphones, beam-EQs, mean-IRs and IR-variances can be calculated and characterized for beam-IRs. As before, "beam-IR-variances" are characterized beforehand for object-free conditions. When measured variances differ from those of object-free characterizations the system can define a likelihood or indication of a possible object. As noted with use of mic-IRs above, a variance can also be calculated for each beam-IR. The beam-IR with the most atypical beam-IR-variance (where atypical could simply be largest, or where atypical can have a statistical characterization) can indicate a possible direction.

Another procedure to sense direction involves changing the loudspeaker playback. With multiple loudspeakers one can, even slightly, radiate more acoustic signal in some directions over others. This "wobble" in radiated energy can be done by a combination of changing levels and filtering applied to each loudspeaker. Such changes can be imperceptible to a use of the system while providing sufficient change for the type of system we have based on IR variances.

For each possible "wobble" setting one can determine mic-EQs (or beam-EQs) that minimize variance in the free-field condition. This defines how one will later calculate mean-IRs and IR-variances for a given playback "wobble" setting. Alternatively, one can use settings/EQs determined without a wobble as before. During nominal operation of the device, the device may at times wobble the radiated power in a given direction. Directions that show the greatest deviations in variance compared to "free-field" characterization(s) indication possible object directions. Wobbling the loudspeakers may only occur after the presence of an object is detected as described before. Thus the wobble procedure serves mainly as an additional confirmation of object presence with the added ability to estimate something about object direction. Again, such a "wobble" may be so slight as to be imperceptible to a listener.

Mic-EQs and/or beam-EQs are optional in the system presented. It could be that, by design (e.g., by symmetry in layout and playback), these EQs can be ignored while still allowing the system to differentiate object-free conditions from conditions with objects.

The system may also be augmented by additionally considering IR energies in various regions. While measurements, such as energy, can be misleading, given the fact that the self-coupling can overwhelm energy calculations in general, changes in these IR energies with beam direction or loudspeaker-wobble can help identify regions of interest, in time and/or direction, where inter-IR-variances or inter-beam-IR variances should be more carefully examined. These regions may suggest areas where IR-variances can mislead decisions.

Using mean-IRs, possibly with calibrated EQs, and the resulting IR-variance enables one to tease out fine details/statistical-changes inside of the IRs that are generally difficult to determine with simple energy (e.g., IR-energy) or shape (e.g., IR-shape) measurements.

This may be advantageous when self-coupling is stronger than couplings that depend on objects. For example, when loudspeakers and microphones are co-located in the same device/enclosure. Time domain signals, such as raw mic signals and mic-IRs, may be dominated by self-coupling. Raw signals and IRs may be quite noisy, making it hard to tell the difference between signals and IRs with and without objects.

This may also be advantageous for finding statistical changes even when self and object-dependent mic-loudspeaker couplings overlap strongly in time and frequency. Such overlap may occur when objects close to the device are at distances similar to inter mic-loudspeaker distances and within the "ringing" of the self-coupling response.

The sensitivity of the inter-IR variance system may allow minor changes in playback to provide direction information. Such playback changes may be imperceptible to a listener.

When deviations of inter-IR variance from object-free characterizations involve energy ratios, the system may be insensitive to some device settings such as microphone gains. The use of IRs as the underlying statistic may also make the system somewhat insensitive to variations in playback material.

Using multiple microphones, or multiple beams, for mean and variance calculations may allow the use of existing signals, such as speech and music, rather than a specific playback signal design. In general, a "passive" system is used in which nominal playback of prevailing speech and music is unaltered and sufficient for detection. This can be augmented by beamforming mics without affecting playback. Sometime an "active" system may be used, such as when there are multiple loudspeakers. In an active system playback may be slightly changed to improve detection.

The use of mean and variance as the detection and estimation statistics may allow estimated quantities, like estimated IRs, to be used effectively. Effects such as environmental and estimation noise may be mitigated by using more estimated IR samples. Collecting more estimated IRs will generally provide greater confidence in detection and estimation.

The use of mean and variance as the detection and estimation statistics readily allows the use of more microphones.

Statistical characterization of object-free conditions may allow many configurations that include objects to be treated as though they were object-free. It will be appreciated that there is no true object-free configuration since there are always objects in an environment around an object.

The use of multiple loudspeakers may allow a playback "wobble" in order to enhance directional-dependent statistics. Such a wobble may be imperceptible to many users while still being effective. The sensitivity of the statistical method may allow small statistical changes from an imperceptible wobble to be detected. Such detection may be improved by use of multiple samples of IRs.

Object detection, and determinations of distance and direction may use combinations of passive measurements, active-measurements, calculations of IR-energy and IR-variance, and comparisons of such measurements and calculations to each other and to object-free characterizations. In some embodiments, both active and passive measurements may be used with transitions between active and passive measurements occurring under defined conditions.

Some embodiments may calculate some or all of the values used as described below.

Let the common signal be "x". Assume there are "M" loudspeakers and "N" microphones. The signal "x" passed through a filter "$f_k$" before being played back on loudspeaker "k". For loudspeaker "k" this signal is $$y_k = f_k * x \tag{1}$$

where x=signal
k=loudspeaker k
$f_k$=filter before loudspeaker k
$y_k$=signal from loudspeaker k Let the IR between loudspeaker "k" and microphone "i" be labeled by "$h_{k,i}$". This of course depends on the scenario, e.g. whether free-field or with objects near the device (and where/what such objects are). Thus the received signal on mic "i" with respect to the common signal "x" is $$z_i = \sum_{k=1}^{M} h_{k,i} f_k * x \qquad (2)$$

$$z_i = \sum_{k=1}^{M} h_{k,i} * y_k \qquad (2)$$

where
i=microphone i
M=number of loudspeakers
$h_{k,i}$=IR between loudspeaker k and microphone i
$z_i$=received signal on microphone i The ideal IR between microphone "i" and the common signal "x" is therefore $$q_i = \sum_{k=1}^{M} h_{k,i} f_k \qquad (3)$$

where
$q_i$=ideal IR between microphone i and the common signal x

Here the IR $q_i$ is a time-domain signal, more generally indexed by a time variable "t" such as $q_i(t)$.

In practice ideal IRs are not available and one has to estimate such IRs. This can be done by an echo-canceller employing techniques such as LMS, RLS, etc. to estimate such IRs. Use of ECs allows us to handle cases where microphones also pick up other signals unrelated to the common signal "x".

For a given situation and duration of time when measurements are taken, let these collection of estimated IRs for all the microphones be $$\{\widehat{q_1}, \widehat{q_2}, \ldots, \widehat{q_N}\} \qquad (4)$$

where
$\widehat{q_i}$ =estimated IR between microphone i and the common signal x Let the EQ for estimated-IR "i" be $w_i$. Then the mean-IR "q" is defined by $$q = \frac{1}{N} \sum_{i=1}^{N} \widehat{q_i} w_i \qquad (5)$$

where
$w_i$=equalizing weighting factor for the ith microphone
q=mean IR between all microphones and the common signal x Note, for some applications it is acceptable that $w_i$=1 for all i, in which case all microphones are weighted equally.

An IR-variance with respect to mic "i" with respect to a time interval [$t_1$, $t_2$] is defined by $$v_i(t_1, t_2) = \frac{1}{(t_2 - t_1 + 1)} \sum_{t=t_1}^{t_2} ((w_i \widehat{q_i})(t) - q(t))^2 \qquad (6)$$

The "IR-variance", which considers all mics, over a time interval [$t_1$, $t_2$] is simply the mean of the above quantity $\{v_i(t_1, t_2)\}$ over all mics.

Also note that if one has multiple IR estimates for a given mic one can extend (5) and (6) above to calculate means and variances over multiple IR-estimates. This helps to mitigate estimation and measurement noise (and natural variations). This can be done by appropriately extending the summation over such multiple estimates per mic.

For example, if we add another index "s" to indicate different samples of a mic-IR, possibly calculated at different times and with different common signals, with "S" samples per mic one can extend (5) and (6) to give $$q = \frac{1}{SN} \sum_{s=1}^{NS} \sum_{i=1}^{N} \widehat{q_{i,s}} w_i \qquad (7)$$

$$v_i(t_1, t_2) = \frac{1}{S \times (t_2 - t_1 + 1)} \sum_{s=1}^{S} \sum_{t=t_1}^{t_2} ((w_i \widehat{q_{i,s}})(t) - q(t))^2 \qquad (8)$$

This helps, as noted already, to improve statistical measures that are our underlying detection statistics.

IR-energy with respect to mic "i" over a time interval [$t_1$, $t_2$] is simply $$e_i(t_1, t_2) = \sum_{t=t_1}^{t_2} ((w_i \widehat{q_i})(t))^2$$

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:
1. An electronic device comprising:
a device housing;
a loudspeaker contained within the device housing;
a plurality of microphones contained within the device housing;
a control circuit electrically coupled to the loudspeaker and the plurality of microphones, the control circuit providing an output signal to the loudspeaker, the control circuit receiving input signals from the plurality of microphones, wherein the input signals are gener- ated by the plurality of microphones sensing sounds output by the loudspeaker based on the output signal, wherein the control circuit is configured to perform analysis operations including:

determining, based on the input signals, individual impulse responses from the plurality of microphones, determining a first statistical measure of the individual impulse responses, retrieving a second statistical measure, wherein the second statistical measure is of individual object-free impulse responses from the plurality of microphones, and comparing the first statistical measure with the second statistical measure to determine if an object is near the device.

2. The electronic device of claim 1 wherein the first statistical measure is a first variance and the second statistical measure is a second variance, wherein the first variance is calculated using differences between the individual impulse responses and a mean impulse response that is a linear combination of the individual impulse responses for the plurality of microphones.

3. The electronic device of claim 2 wherein the linear combination of the individual impulse responses for the plurality of microphones are weighted with linear weights chosen such that the variance is minimized.

4. The electronic device of claim 1 wherein it is determined that an object is near the device if the difference between the first statistical measure and the second statistical measure is larger than a predetermined threshold.

5. The electronic device of claim 1 wherein the control circuit includes one or more echo cancellers configured to mitigate effects of at least one of common signals and other acoustic sources in the vicinity of the electronic device.

6. The electronic device of claim 1 wherein the electronic device further comprises a plurality of loudspeakers and the control circuit provides output signals to the plurality of loudspeakers such that the plurality of loudspeakers radiate more acoustic signal in a first direction than in a second direction.

7. The electronic device of claim 6 wherein the electronic device further comprises a plurality of equalization filters that are coupled to the plurality of loudspeakers, at least one of the plurality of equalization filters being different from the remaining plurality of equalization filters.

8. The electronic device of claim 1 wherein the control circuit includes a plurality of echo cancellers configured to estimate the individual impulse responses from the plurality of microphones.

9. The electronic device of claim 1 wherein the control circuit is configured to perform the analysis operations based at least in part on a selected time-domain region.

10. The electronic device of claim 1 wherein the output signal to the loudspeaker includes at least one of speech or music.

11. A control circuit for an electronic device that includes a loudspeaker and a plurality of microphones within a device housing, the control circuit providing an output signal to the loudspeaker, receiving input signals from the plurality of microphones, wherein the input signals are generated by the plurality of microphones sensing sounds output by the loudspeaker based on the output signal, and wherein the control circuit is configured to perform analysis operations comprising:

determining, based on the input signals, a first statistical measure of individual impulse responses from the plurality of microphones, retrieving a second statistical measure of individual object-free impulse responses from the plurality of microphones, and comparing the first statistical measure with the second statistical measure to determine if an object is near the device.

12. The control circuit of claim 11 wherein the first statistical measure is a first variance and the second statistical measure is a second variance, wherein the first variance is calculated using differences between the individual impulse responses and a mean impulse response that is a linear combination of the individual impulse responses for the plurality of microphones.

13. The control circuit of claim 12 wherein the linear combination of the individual impulse responses for the plurality of microphones are weighted with linear weights chosen such that the variance is minimized.

14. The control circuit of claim 11 wherein the output signal includes at least one of music or speech and wherein it is determined that an object is near the device if the difference between the first statistical measure and the second statistical measure is larger than a predetermined threshold.

15. The control circuit of claim 11 further providing one or more echo cancellers configured to mitigate effects of at least one of common signals and other acoustic sources in the vicinity of the electronic device.

16. The control circuit of claim 11 wherein output signals are provided to a plurality of loudspeakers in the device such that the plurality of loudspeakers radiate more acoustic signal in a first direction than in a second direction.

17. The control circuit of claim 16 wherein a plurality of equalization filters are coupled to the plurality of loudspeakers, at least one of the plurality of equalization filters being different from the remaining plurality of equalization filters.

18. The control circuit of claim 11 further providing a plurality of echo cancellers configured to estimate the individual impulse responses from the plurality of microphones.

19. The control circuit of claim 11 wherein the control circuit is configured to perform the analysis operations based at least in part on a selected time-domain region.

20. A method for determining if any object is near an electronic device that includes a loudspeaker and a plurality of microphones within a device housing, the method comprising:

providing an output signal to the loudspeaker that includes at least one of speech or music;

receiving input signals from the plurality of microphones, wherein the input signals are generated by the plurality of microphones sensing sounds output by the loudspeaker based on the output signal, and performing analysis operations including:

determining, based on the input signals, a first statistical measure of individual impulse responses from the plurality of microphones, retrieving a second statistical measure of individual object-free impulse responses from the plurality of microphones, and comparing the first statistical measure with the second statistical measure to determine if an object is near the device.

21. The method of claim 20 wherein the first statistical measure and the second statistical measure are calculated using differences between the individual impulse responses and a mean impulse response that is a linear combination of the individual impulse responses for the plurality of microphones.

22. The method of claim 21 wherein the linear combination of the individual impulse responses for the plurality of microphones are weighted with linear weights chosen such that variance is minimized.

23. The method of claim 20 wherein it is determined that an object is near the device if the difference between the first statistical measure and the second statistical measure is larger than a predetermined threshold.

24. The method of claim 20 further comprising providing output signals to a plurality of loudspeakers in the device such that the plurality of loudspeakers radiate more acoustic signal in a first direction than in a second direction.

25. The method of claim 20 comprising performing the analysis operations based at least in part on a selected time-domain region.

* * * * *